US011536305B2

(12) United States Patent
Fujiwara et al.

(10) Patent No.: US 11,536,305 B2
(45) Date of Patent: Dec. 27, 2022

(54) JUNCTION STRUCTURE

(71) Applicant: Panasonic Intellectual Property Management Co., Ltd., Osaka (JP)

(72) Inventors: Junji Fujiwara, Osaka (JP); Atsuhiro Kawamoto, Hyogo (JP); Tatsuyuki Nakagawa, Osaka (JP); Toru Sakai, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 763 days.

(21) Appl. No.: 16/479,963

(22) PCT Filed: Jan. 23, 2018

(86) PCT No.: PCT/JP2018/001855
§ 371 (c)(1),
(2) Date: Jul. 23, 2019

(87) PCT Pub. No.: WO2018/142994
PCT Pub. Date: Aug. 9, 2018

(65) Prior Publication Data
US 2019/0368524 A1    Dec. 5, 2019

(30) Foreign Application Priority Data
Jan. 31, 2017 (JP) .............................. JP2017-015541

(51) Int. Cl.
*F16B 5/08* (2006.01)
*B23K 9/025* (2006.01)
*B23K 9/23* (2006.01)

(52) U.S. Cl.
CPC ................ *F16B 5/08* (2013.01); *B23K 9/025* (2013.01); *B23K 9/232* (2013.01)

(58) Field of Classification Search
CPC ...... B23K 9/025; B23K 9/232; B23K 26/324; B23K 26/323; B23K 26/21; F16B 5/08
See application file for complete search history.

(56) References Cited

U.S. PATENT DOCUMENTS

2009/0278371 A1* 11/2009 Fuchs ................... B29C 65/562
156/60
2016/0123362 A1* 5/2016 Iwase ...................... F16B 19/06
411/82

(Continued)

FOREIGN PATENT DOCUMENTS

JP    2006-289437    10/2006
JP    2008-006465    1/2008

(Continued)

OTHER PUBLICATIONS

International Search Report of PCT application No. PCT/JP2018/001855 dated Mar. 6, 2018.

(Continued)

*Primary Examiner* — Brian W Jennison
(74) *Attorney, Agent, or Firm* — Wenderoth, Lind & Ponack, L.L.P.

(57) ABSTRACT

A junction structure includes a first material that is a metallic material, a third material that is a metallic material and is weldable to the first material, and a second material which is a nonferrous metallic material or a nonmetallic material. The second material is sandwiched and fixed between the first material and the third material by lap joining. At least one of the first material or the third material has a weld zone where the first material and the third material are melted and joined together, and at least one exhaust groove or at least one exhaust hole around the weld zone. The at least one exhaust groove or the at least one exhaust hole penetrates a thickness of the at least one of the first material or the third material.

16 Claims, 9 Drawing Sheets

(56) References Cited

U.S. PATENT DOCUMENTS

| | | | | |
|---|---|---|---|---|
| 2016/0167158 A1* | 6/2016 | Spinella | ............. | B23K 11/3009 403/270 |
| 2016/0339966 A1* | 11/2016 | Iwase | ................... | B62D 25/105 |
| 2017/0023038 A1* | 1/2017 | Izuhara | ..................... | F16B 5/08 |

FOREIGN PATENT DOCUMENTS

| JP | 2010-207886 | 9/2010 |
|---|---|---|
| JP | 2012-254481 | 12/2012 |
| JP | 2014-226698 | 12/2014 |
| JP | 2015-042417 | 3/2015 |
| JP | 2015-062911 | 4/2015 |
| JP | 2015-062916 | 4/2015 |
| JP | 2015-066570 | 4/2015 |

OTHER PUBLICATIONS

Examination Report dated Apr. 1, 2021 in corresponding Indian Patent Application No. 201947030480.

\* cited by examiner

JUNCTION STRUCTURE

CROSS-REFERENCE TO RELATED APPLICATIONS

This application is a U.S. national stage application of the PCT International Application No. PCT/JP2018/001855 filed on Jan. 23, 2018, which claims the benefit of foreign priority of Japanese patent application No. 2017-015541 filed on Jan. 31, 2017, the contents all of which are incorporated herein by reference.

TECHNICAL FIELD

The present disclosure relates to a rivet-joined structure including similar metallic materials and at least one material that is different in type from the similar metallic materials and that is sandwiched between the similar metallic materials. These materials are joined together with rivets by using laser, arc, or plasma as the heat source.

BACKGROUND ART

The recent worldwide increase in the production of automobiles and other transportation vehicles has created a growing demand for reducing the total cost for each vehicle as well as for reducing the production time so as to increase vehicle production.

Furthermore, there is a growing global demand for reducing $CO_2$ emissions to prevent global warming. This demand has been answered by the transportation vehicle industry, which has been making increasing efforts to improve the fuel efficiency of vehicles. One of the efforts is to reduce the vehicle weights by, for example, increasing the proportion of light-weight materials in the vehicles.

With such a background, spot welding has been often used in this industry. This welding is a kind of resistance welding in which the materials to be welded are pressurized by upper and lower electrodes until no gap remains between the materials, and then the electrodes are energized. For this reason, spot welding is not suitable for one side welding. In other words, spot welding imposes limitations on the product shape because the parts to be welded are sandwiched from above and below. Another disadvantage of this welding is that pressurizing the parts to be welded needs a space into which the welding gun having the upper and lower electrodes is inserted above and below the materials to be welded. Still another disadvantage is that beside welding time, spot welding takes additional time, such as the time to carry the heavy gun to the parts to be welded, the time to pressurize the materials after the gun reaches the parts to be welded, and the time to cool the welded parts.

Meanwhile, the industry has been trying to reduce the weight of materials of some automobile parts by replacing steel with light metal such as aluminum. This trend has created a growing demand for techniques and structures that allow the joining of light metal and steel.

Different types of materials have conventionally been joined together by using, for example, rivets for spot welding or adhesives for bonding purposes. Japanese Unexamined Patent Application Publication No. 2015-42417 discloses a joined structure in which rivets and a material of the same type as the rivets sandwich a different type of material. To be more specific, Japanese Unexamined Patent Application Publication No. 2015-42417 discloses the following techniques: a method for pressing the above-mentioned different type of material between the rivets and the material of the same type as the rivets; the shape of rivets capable of absorbing the plastic flow of the different type of material caused by welding heat; and methods of crimping and spot welding capable of the absorption. These methods ensure the space into which the deformed part of the different type of material is moved during the crimping and spot welding. The methods also prevent depression of the different type of material due, for example, to misalignment of the electrodes during spot welding, thereby maintaining the joining strength.

SUMMARY

The conventional joining of different types of materials needs rivets with a complicated-shaped part, such as a radius-chamfered part or an annular groove. These rivets provide a space to accommodate the deformed part of the different type of material during crimping and spot welding. These rivets also prevent depression of the different type of material caused by the misalignment of the electrodes during spot welding, thereby maintaining the joining strength between the joined materials. These rivets with such a complicated-shaped part are fabricated by high precision processing technology, thus increasing the production cost.

Furthermore, resistance spot welding involves time-consuming steps such as pressurization, energization, cooling, and transfer. Moreover, a set of materials to be joined together is sandwiched from both sides, which indicates a low degree of design freedom. In addition, adjacent rivets too close to each other can cause current diversion during spot welding. This would result in insufficient formation of a nugget, which is a part welded and solidified in the resistance welding. A desired nugget without current diversion can be formed by setting the pitch between adjacent rivets at not less than the minimum pitch. Arranging rivets at a pitch not less than the minimum pitch cannot improve joining stiffness at required positions.

When a surface-treated material such as a zinc-plated steel sheet is resistance spot welded, the molten material of the plated layer on the material surface is likely to be adhered to the electrode surfaces. The adhesion of the molten material to the electrode surfaces can cause uneven melting of the surface-treated material or uneven thickness of the plated layer during resistance spot welding. This causes current density to be unstable, and hence, the nugget shape, which is the key to the welding quality, to be unstable. This increases the maintenance workload such as polishing or replacement of the electrodes.

The present disclosure provides a rivet-joined structure that may include a surface-treated material such as a zinc-plated steel sheet or a non-metallic material such as resin, and that can also be produced simply and easily by laser, arc, or plasma welding.

To achieve the above-mentioned object, the joined structure according to an aspect of the present disclosure includes at least one similar metallic material weldable to each other. The at least one similar metallic material has the following: a weld zone where the at least one similar metallic material is melted and joined together; and at least one exhaust groove or at least one exhaust hole around the weld zone. The at least one exhaust groove or the at least one exhaust hole extends along the thickness of the at least one similar metallic material. The joined structure further includes at least one different material different in type from the at least one similar metallic material and difficult to be welded to the at least one similar metallic material, the at least one different material being sandwiched and fixed between the at least one similar metallic material by lap joining.

In the joined structure according to the aspect of the present disclosure, the weld zone may have a circular or oval ring-shaped pattern, the ring-shaped pattern being a welding pattern to which energy is applied from a heat source, and the at least one exhaust groove or the at least one exhaust hole may be located either inside or outside the ring-shaped pattern.

In the joined structure according to the aspect of the present disclosure, the weld zone may have a spot or linear pattern, the spot or linear pattern being a welding pattern to which energy is applied from a heat source, and the at least one exhaust groove or the at least one exhaust hole may be located outside the spot or linear pattern.

In the joined structure according to the aspect of the present disclosure, the at least one different material may have a through part, and at least one of the at least one similar metallic material may have a projection. The at least one different material may be sandwiched between the at least one similar metallic material in such a manner that the projection is inserted in the through part and that the projection and the through part are spaced from each other by a predetermined gap in the radial or width direction of the through part, the predetermined gap is provided inside smaller than the diameter or the width of the through part. The at least one similar metallic material may be melted by energy applied to the projection from a heat source along the thickness of the at least one similar metallic material, so that the at least one similar metallic material and the at least one different material are fixed and joined together.

In the joined structure according to the aspect of the present disclosure, the projection may have a region to which the energy is applied from the heat source along the thickness of the at least one similar metallic material, the region being smaller by a predetermined amount than the diameter or the width of the projection.

In the joined structure according to the aspect of the present disclosure, the heat source may be laser, and the least one similar metallic material may be melted and joined together by the laser applied along the thickness of the least one similar metallic 8 the least one similar metallic material and the at least one different material sandwiched between the least one similar metallic material are fixed together.

In the joined structure according to the aspect of the present disclosure, the heat source may be arc, and the least one similar metallic material may be melted and joined together by the arc applied along the thickness of the least one similar metallic material, such that the least one similar metallic material and the at least one different material sandwiched between the least one similar metallic material are fixed together.

In the joined structure according to the aspect of the present disclosure, the heat source may be plasma, and the least one similar metallic material may be melted and joined together by the plasma applied along the thickness of the least one similar metallic material, such that the least one similar metallic material and the at least one different material sandwiched between the least one similar metallic material are fixed together.

In the joined structure according to the aspect of the present disclosure, the surface of the through part may be melted by indirect heat generated when the projection is welded, the surface flowing and being fixed around the outer periphery of the projection of the at least one similar metallic material.

In the joined structure according to the aspect of the present disclosure, the at least one similar metallic material may have a positioning protrusion at the end of the at least one exhaust hole or the at least one exhaust groove formed outside the projection, the positioning protrusion protruding toward the at least one different material and capable of positioning the at least one different material.

In the joined structure according to the aspect of the present disclosure, the at least one similar metallic material may include two opposing similar metallic materials, and the positioning protrusion may be formed at the end of the at least one exhaust hole or the at least one exhaust groove formed outside the projection of at least one of the two opposing similar metallic materials.

The joined structure according to the aspect of the present disclosure achieves highly reliable joining of different types of materials. This structure can greatly reduce production cycle time, improve stiffness at required positions, and increase the degree of design freedom of the joined materials.

DESCRIPTION OF EMBODIMENTS

First Exemplary Embodiment

A first exemplary embodiment in which the welding heat source is laser will now be described with reference to FIGS. 1 to 15.

Figure 1:
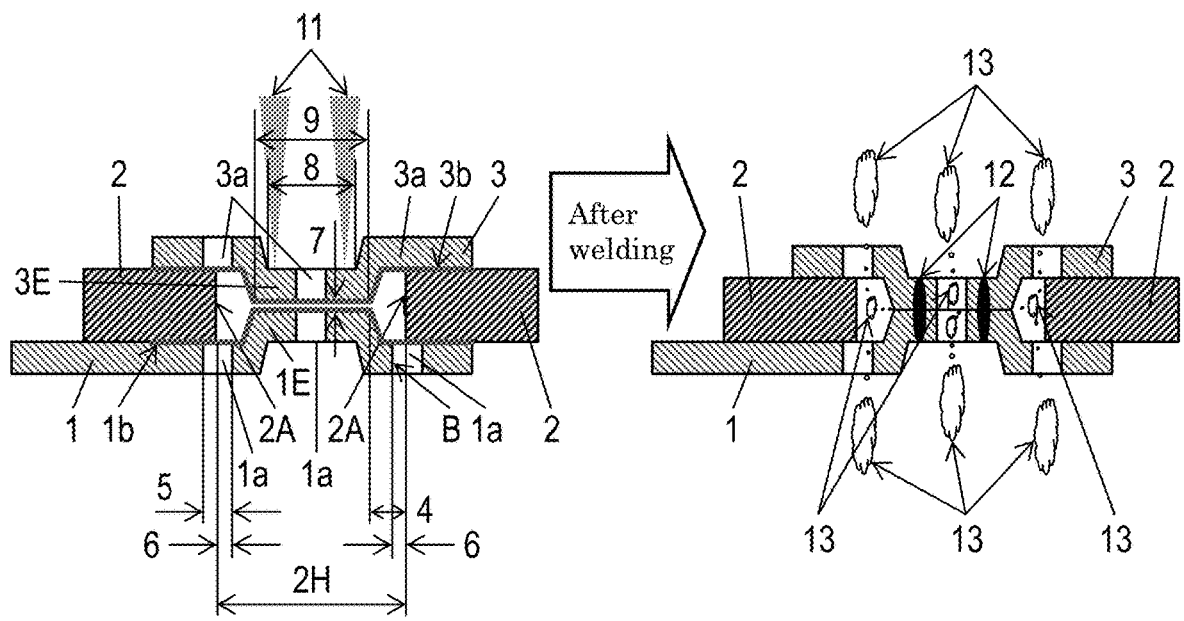
FIG. 1 is a schematic diagram of an example of the joined structure during laser welding according to a first exemplary embodiment of the present disclosure.

FIG. 1 is a sectional view of an example of the joined structure taken along line A-A of FIGS. 6 to 9. The joined structure shown in FIGS. 6 to 9 is composed of the following members: first material 1 and third material 3, which are similar metallic materials, and second material 2, which is different in type from materials 1 and 3. Third material 3 is the uppermost plate of the joined structure, and is circular-shaped in FIGS. 6 and 7 and is rectangular-shaped in FIGS. 8 and 9.

In the joined structure shown in FIG. 1, first material 1 and third material 3, which are similar metallic materials, sandwich between them second material 2, which is different in type from materials 1 and 3, so that materials 1, 2 and 3 are joined together.

Second material 2 has through-hole 211 as a through part. The first material has projection 1E, and the third material has projection 3E. Projections 1E and 3E are inserted into through-hole 211 such that projections 1E and 3E are disposed face-to-face. This placement has the effect of reducing misalignment of first material 1 and third material 3 relative to through-hole 211 of second material 2. This placement also allows visually checking the mark of a laser position and the appropriateness of the position of the bead. The through part may be a through groove instead of through-hole 211.

Projection 1E and/or projection 3E of first material 1 and/or third material 3 can be positioned with respect to through-hole 211 of second material 2 by using an unillustrated clamping tool, positioning pin, or robot arm.

Projections 1E and 3E of first material 1 and third material 3 are embossed. Each of projections 1E and 3E has inner peripheral region 8 and outer peripheral region 9 larger than region 8 by the thickness of materials 1 and 3, for example, about 1 mm. In the present description, the offset of region 9 from region 8 is +1 mm. The offset is preferably as large as the thickness of materials 1 and 3, but may be 0.6 to 1.4 times as large unless it reduces the welding strength.

The similar metallic materials are defined as metallic materials weldable to each other. They can not only be the same materials, but also be materials readily weldable to each other, such as ferrous metals or nonferrous metals. To be more specific, materials 1 and 3 can be a combination of ferrous metals, for example, two types of mild steel (including surface-treated materials); mild steel and stainless steel; two types of stainless steel; mild steel and high-tensile steel; high-tensile steel and stainless steel; and two types of high-tensile steel. Materials 1 and 3 can also be a combination of nonferrous metals, for example, two types of aluminum; aluminum and an aluminum alloy; and two types of aluminum alloys.

Meanwhile, second material 2 is defined as a material different from and difficult to be welded to first material 1 and third material 3. For example, when first material 1 and third material 3 are ferrous metals, second material 2 can be a nonferrous metal such as copper or aluminum. When first material 1 and third material 3 are metallic materials, second material 2 can be a non-metallic material, such as carbon fiber reinforced plastic (CFRP), polyethylene terephthalate (PET) or other resins.

The joined structure composed of first material 1 and third material 3 as the similar metallic materials and second material 2 as the different material sandwiched between them will now be described in detail.

The projections in the weld zone of first material 1 and third material 3 have the same shape in the present exemplary embodiment. When projections 1E and 3E are disposed face-to-face in through-hole 211, the gap between outer peripheral region 9 and inner periphery 2A of through-hole 211 in the direction perpendicular to the thickness of materials 1 and 3 is referred to as first gap 4.

Figure 6:
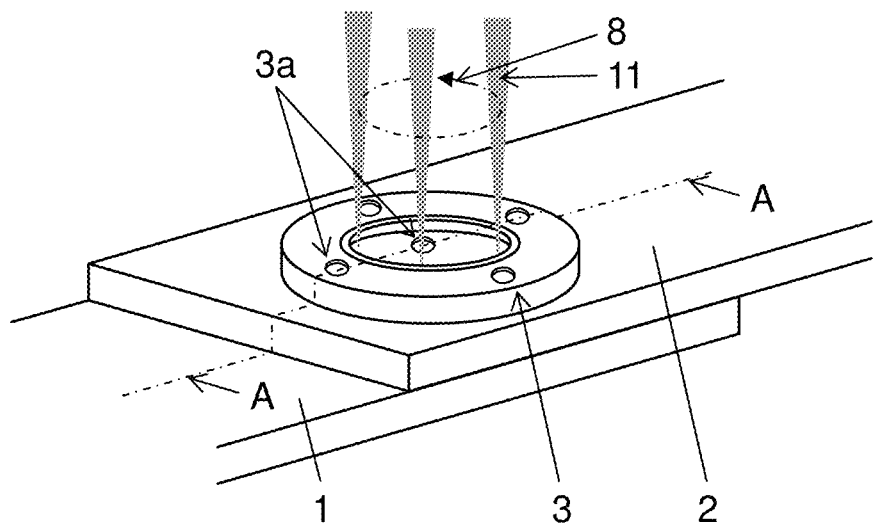
FIG. 6 is a perspective view of an example of the joined structure during laser welding according to the first exemplary embodiment of the present disclosure.
Figure 7:
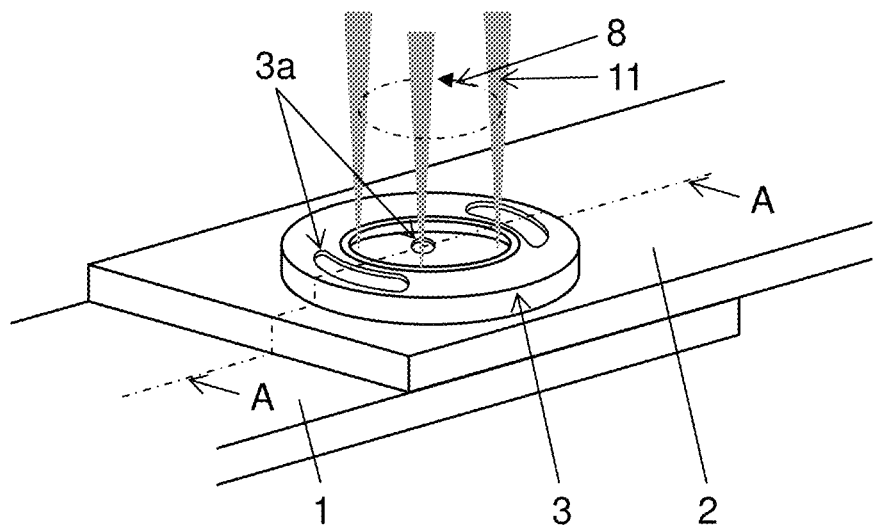
FIG. 7 is a perspective view of an example of the joined structure during laser welding according to the first exemplary embodiment of the present disclosure.

When projections 1E and 3E are disposed face-to-face in through-hole 211, the gap between projections 1E and 3E in the direction along the thickness of materials 1 and 3 is referred to as second gap 7. As seen from above in FIGS. 6 and 7, inner peripheral region 8 is a weldable region defined by the diameter or width of the inner peripheral region of projection 3E of third material 3. As shown in FIGS. 6 and 7, from above in the direction along the thickness of third material 3, laser 11 is applied circularly to inner peripheral region 8 of projection 3E, which is the laser application region (the weldable region). This allows the formation of a bead, which is fusion zone 12 shown in FIG. 1. Fusion zone 12 can have a ring-shaped pattern such as a circular, oval, or rectangular-shaped pattern.

The joined structure according to the present disclosure is characterized in that first material 1 and third material 3 have exhaust holes (or exhaust grooves) 1a and 3a around (inside or outside) projections 1E and 3E, respectively. Exhaust holes (or exhaust grooves) 1a and 3a are effective when first material 1 and third material 3 are made from a surface-treated material such as a material having a zinc-plated surface or when second material 2 is made of resin.

Next, a welding process and the result of the process will be described as follows with reference to FIG. 1.

First, laser 11 is circularly applied for welding to inner peripheral region 8 of the projections of first material 1 and third material 3. While first material 1 and third material 3 are being welded, fusion zone 12 (molten metal) is solidified and contracted. On this account, it is preferable for projections 1E and 3E to be separated from each other by second gap 7 along the thickness of materials 1 and 3. The solidification and contraction of fusion zone 12 reduces the size of second gap 7 between projections 1E and 3E. The reduction of second gap 7 functions to compress and fix second material 2 between first material 1 and third material 3.

In the present exemplary embodiment, first material 1 and third material 3 are surface-treated materials such as zinc-plated steel sheets. The zinc-plated steel sheets generate zinc vapor when plated zinc 13 is evaporated during laser welding. Plated zinc 13, when evaporated, can cause welding problems. How plated zinc 13 in gaseous form is exhausted will now be described with reference to FIG. 1.

The laser application region (heat supply region) to which laser 11 is applied in projections 1E and 3E along the thickness of materials 1 and 3 is provided inside smaller than the diameter or width of the embossed projections 1E and 3E, and is also provided inside smaller than the diameter or width of inner peripheral region 8 of projections 1E and 3E by, for example, about 2 mm.

When laser 11 is applied to fusion zone 12, melted fusion zone 12 transmits heat, which evaporates surface-treated layer 1*b* of first material 1 and surface-treated layer 3*b* of third material 3. In this case, plated zinc 13 evaporated from surface-treated layers 1*b* and 3*b* may be exhausted through the molten metal in keyholes generated when the laser is applied to first material 1 and third material 3. Therefore, if there were no gap between second material 2 and each of first material 1 and third material 3, plated zinc 13 in gaseous form would significantly escape through the molten metal, blowing off the metal and causing its sputtering. This would cause pits in the bead.

In the present exemplary embodiment, this is avoided by forming exhaust holes (or exhaust grooves) 1*a* and 3*a* for exhausting plated zinc 13 in gaseous form around the weld zone where first material 1 and third material 3 are melted and joined together. What is important to accelerate the exhaust flow is the spatial relationship between exhaust holes (or exhaust grooves) 1*a* and 3*a* and inner periphery 2A of through-hole 211 of second material 2. Exhaust holes (or exhaust grooves) 1*a* and 3*a* are located either inside inner periphery 2A or aligned with inner periphery 2A, and at the same time, are located outside projections 1E and/or 3E. In FIG. 1, inner edge region 6 of the exhaust area of second material 2 indicates the distance between the inner diameter surface of exhaust holes (or exhaust groove) 1*a* and 3*a* and inner periphery 2A of through-hole 211. To ensure the exhaust passage of plated zinc 13 in gaseous form, through-hole 211 should be as large as possible compared with exhaust holes (or exhaust grooves) 1*a* and 3*a*, or in other words, inner periphery 2A of through-hole 211 should be as outside as possible along the thickness of materials 1 and 3.

Figure 3A:
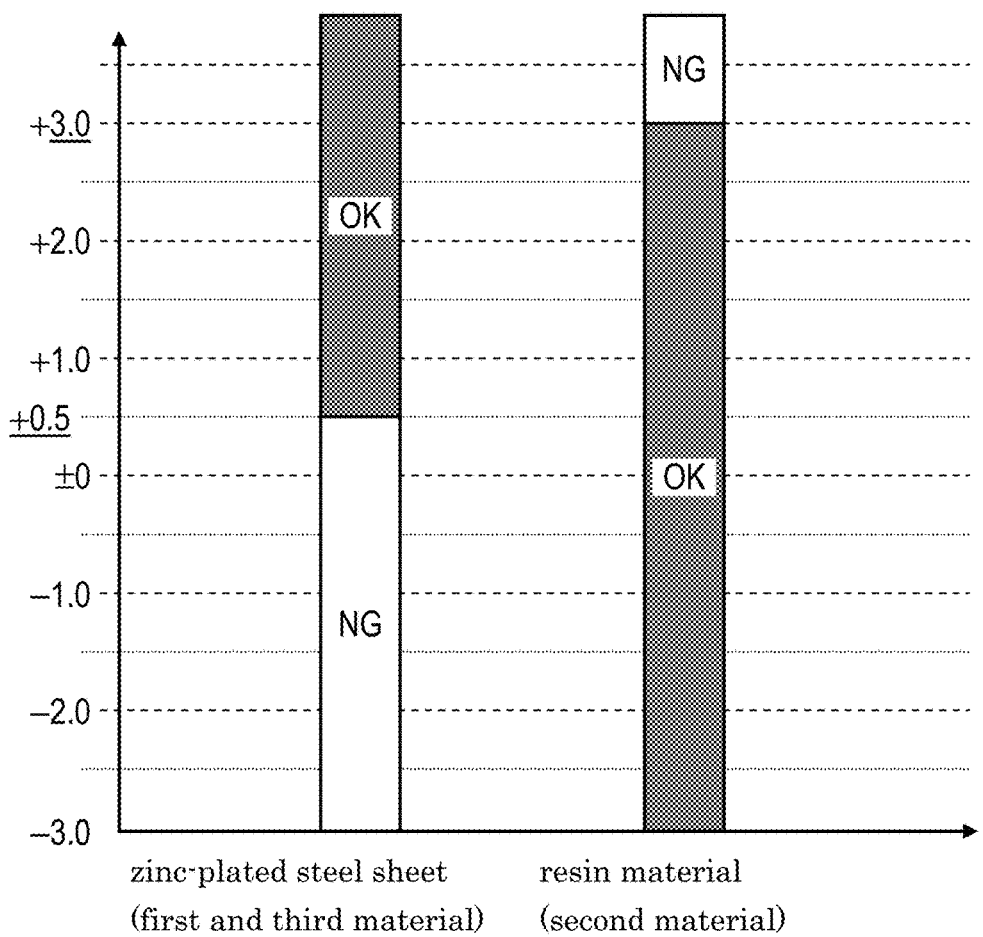
FIG. 3A shows the relationship between the first material, the third material, the second material, and inner edge region 6 of the exhaust area as a gap in the joined structure according to the first exemplary embodiment of the present disclosure.
Figure 3B:
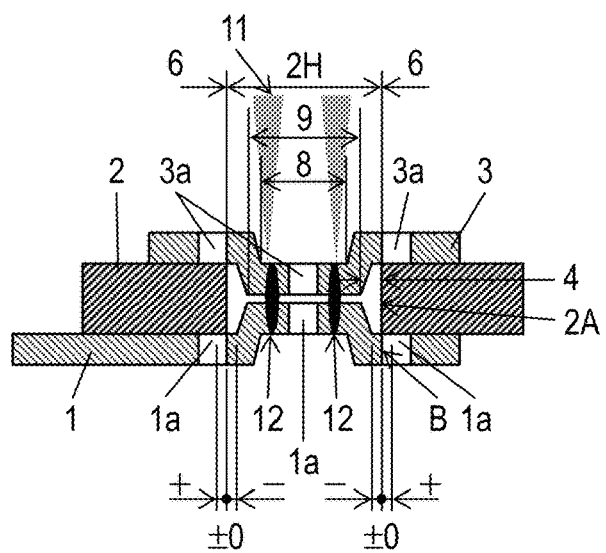
FIG. 3B is a schematic diagram of an example of the joined structure during laser welding according to the first exemplary embodiment of the present disclosure.
Figure 4:
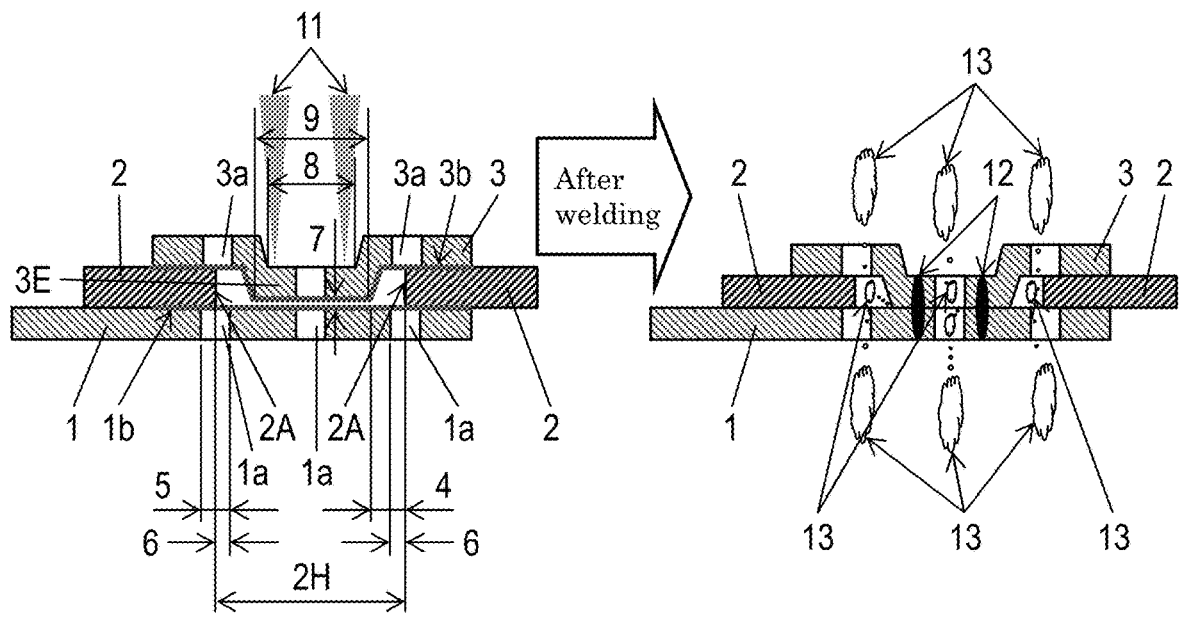
FIG. 4 is a schematic diagram of an example of the joined structure during laser welding according to the first exemplary embodiment of the present disclosure.
Figure 5:
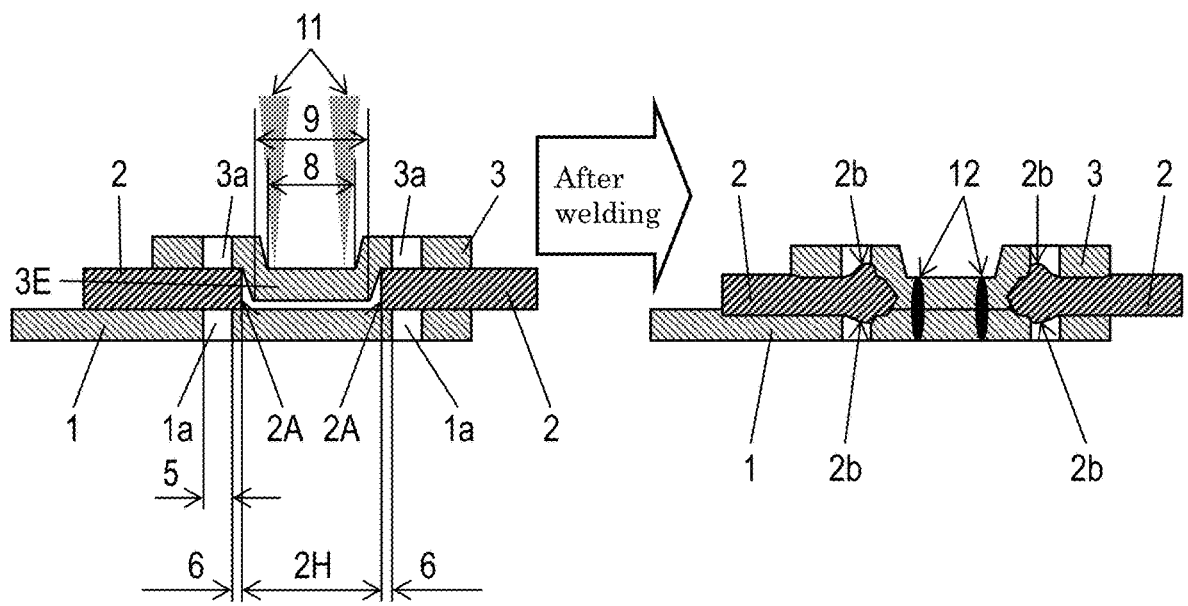
FIG. 5 is a schematic diagram of an example of the joined structure during laser welding according to the first exemplary embodiment of the present disclosure.

FIGS. 3A and 3B show the experimental data of the relationship between inner edge region 6 of the exhaust area of second material 2 and the type of first and third materials 1 and 3 or the type of second material 2.

In the example of FIGS. 3A and 3B, first material 1 and third material 3 are zinc-plated steel sheets with a thickness t of 1.6 mm whereas second material 2 has a thickness t of 2.0 mm. First material 1 and third material 3 sandwich second material 2 between them from above and below, and laser of 3 kw output is applied circularly to these stacked materials.

In this example, inner peripheral region 8 of the projections of first material 1 and third material 3 has a diameter of φ10 mm whereas through-hole 211 of second material 2 has a diameter of φ12 mm. Laser 11 as the heat source is applied to projections 1E and 3E along the thickness of materials 1 and 3 so as to weld the laser application region circularly with a diameter of φ8 mm, which is slightly provided inside smaller than inner peripheral region 8.

Inner edge region 6 is indicated the distance between the inner diameter surface of exhaust holes (or exhaust groove) 1*a* and 3*a* and inner periphery 2A of through-hole 211.

When first material 1 is a zinc-plated steel sheet, plated zinc 13 in gaseous form can be easily exhausted from fusion zone 12 as long as inner edge region 6 of the exhaust area is at least +0.5 mm. To be more specific, when laser 11 is applied to inner peripheral region 8 of at least one of the projections of first material 1 and third material 3, plated zinc 13 is evaporated from fusion zone 12 due to the influence of welding heat. If plated zinc 13 in gaseous form is blown out through second gap 7 between projections 1E and 3E, this would cause defective joining. However, when inner edge region 6 of the exhaust area is 0.5 mm or larger, plated zinc 13 in gaseous form can be easily exhausted through exhaust holes (or exhaust grooves) 1*a* and 3*a*. This prevents the occurrence of defective joining, thereby enabling second material 2 to be compressed and fixed to first material 1 and third material 3.

Meanwhile, if inner edge region 6 of the exhaust area is smaller than 0.5 mm, plated zinc 13 in gaseous form is less likely to be exhausted through exhaust holes (or exhaust grooves) 1*a* and 3*a*. The reason for this is as follows. When inner periphery 2A of through-hole 2H is too close to the inner edge of exhaust holes (or exhaust grooves) 1*a* and 3*a* located outside projections 1E and 3E, the gap between them is too small to allow plated zinc 13 in gaseous form to escape through it.

In this case, the welding heat generated by laser 11 applied to inner peripheral region 8 of projections 1E and 3E may cause plated zinc 13 evaporated from melted fusion zone 12 to flow into second gap 7 between projections 1E and 3E and to be blown out, possibly causing welding failure.

Thus, the gap for exhausting plated zinc 13 in gaseous form is preferably at least 0.5 mm. What is important is the spatial relationship between inner periphery 2A of through-hole 211 of second material 2 and exhaust holes (or exhaust grooves) 1*a* and 3*a* located outside projections 1E and/or 3E.

The size of inner edge region 6 of the exhaust area with respect to through-hole 211 of second material 2 is the same regardless of the thickness of first material 1, third material 3, and second material 2.

Inner edge region 6 of the exhaust area represents the distance between inner periphery 2A of through-hole 211 and the inner diameter surface B of exhaust holes (or exhaust grooves) 1*a* and 3*a*. Inner edge region 6 of the exhaust area is preferably designed in consideration of the spatial variation between second material 2 and first material 1 and/or third material 3. As shown in FIGS. 3A and 3B, the size of inner edge region 6 of the exhaust area is preferably set according to the type of first material 1 and third material 3 or the type of second material 2.

How second material 2 made of PET, which is a resin material, is laser welded will be described with reference to FIG. 2.

First gap 4, which is the clearance between outer peripheral region 9 of the projections 1E and 3E and inner periphery 2A of through-hole 2H, is defined by the diameter of through-hole 2H and the diameter or width of projections 1E and 3E to be inserted into through-hole 2H. As long as first gap 4 is in an appropriate range, the heat generated by laser 11 applied to inner peripheral region 8 of projections 1E and 3E forms fusion zone 12, and hence, softens and liquefies the resin material of second material 2. The liquefied part of resin material 2*b* of second material 2 is exhausted through exhaust holes (or exhaust grooves) 1*a* and 3*a* located outside projections 1E and 3E.

The liquefied part of second material 2 flows into first gap 4 between through-hole 2H and outer peripheral region 9 of projections 1E and 3E. As a result, second material 2 can be fixedly joined to first material 1 and/or third material 3 in the direction orthogonal to the thickness of first material 1 and third material 3. This enables first material 1 and third material 3 to be firmly fixed together not only by the solidification and contraction of fusion zone 12 but also by the contact with second material 2.

If laser 11 were applied for welding to fusion zone 12 when the distance between outer peripheral region 9 of projections 1E and 3E and inner periphery 2A of through-hole 2H is small, or in other words, when first gap 4 is small, the heat of laser 11 would affect second material 2. To be more specific, the heat of laser 11 applied to fusion zone 12 would propagate to second material 2 through inner periphery 2A of through-hole 2H either directly or indirectly from the outer peripheral side of outer peripheral region 9 of first material 1 and/or third material 3.

It sometimes happens during welding that the melted part of second material 2 flows from inner periphery 2A of through-hole 211 into second gap 7 between outer peripheral region 9 of the projections of first material 1 and/or third material 3 along the thickness of these materials. In this case, if second material 2 is made of a low-boiling-point material such as resin, second material 2 may liquefy or evaporate and be blown out, causing fusion zone 12 to be poorly welded.

In the present exemplary embodiment, exhaust holes (or exhaust grooves) 1a and 3a are located outside projections 1E and 3E so as to prevent second material 2 from being blown out to fusion zone 12 even if it is liquefied or evaporated.

As through-hole 211 of second material 2 is smaller, or in other words, as first gap 4 is smaller and inner periphery 2A of through-hole 211 is closer to projections 1E and 3E, second material 2 can be more easily fixed to first material 1 and/or third material in the direction orthogonal to the thickness of materials 1 and 3. The liquefied or evaporated resin material of second material 2 is exhausted through exhaust holes (or exhaust grooves) 1a and 3a located outside projections 1E and/or 3E. This helps prevent the liquefied or evaporated resin material from being blown out of fusion zone 12 during welding.

FIGS. 3A and 3B show the experimental data of the relationship between inner edge region 6 of the exhaust area and the type of first and third material 1, 3 or the type of second material 2. Inner edge region 6 of the exhaust area represents the distance between inner periphery 2A of through-hole 211 and the inner diameter surface B of exhaust holes (or exhaust grooves) 1a and 3a.

First material 1 and third material 3 are made of mild steels with a thickness t of 1.6 mm whereas second material 2 is made of a resin material with a thickness t of 2.0 mm. Second material 2 made of PET is sandwiched between first material 1 and third material 3 from above and below. Next, laser of 3 kw output is applied to projections 1E and 3E of materials 1 and 3 so as to weld the laser application region circularly.

In this example, inner peripheral region 8 of the projections of first material 1 and third material 3 has a diameter of φ10 mm whereas through-hole 211 of second material 2 has a diameter of φ12 mm. Laser 11 as the heat source is applied to projections 1E and 3E along the thickness of materials 1 and 3 so as to weld the laser application region circularly with a diameter of φ8 mm, which is provided inside smaller than inner peripheral region 8 so that the heat supply region can be provided inside smaller than the diameter or width of projections 1E and 3E by a predetermined amount.

When made of PET, which is a resin material, second material 2 can be firmly fixed to first material 1 and third material 3 as long as inner edge region 6 of the exhaust area is +3.0 mm or less. Furthermore, it never happens that the welding heat generated by laser 11 applied to inner peripheral region 8 of at least one of the projections of first material 1 and third material 3 causes the melted part of second material 2 to flow into second gap 7 between projections 1E and 3E and to cause defective joining.

In this case, exhaust holes (or exhaust grooves) 1a and 3a located outside projections 1E and/or 3E help prevent the liquefied or evaporated second material 2 from being blown out to fusion zone 12. Therefore, welding can be performed even if first gap 4 is 0 mm and inner periphery 2A of through-hole 211 is in close contact with projections 1E and 3E.

If inner edge region 6 of the exhaust area exceeds +3.0 mm, outer peripheral region 9 of projections 1E and 3E is too far from through-hole 211 of second material 2, or in other words, first gap 4 is too large. In this case, second material 2 is unlikely to be heated while laser 11 is being applied to inner peripheral region 8 of the projections of first material 1 and third material 3. As a result, the melted part of second material 2 is prevented from flowing into second gap 7 between projections 1E and 3E along the thickness of first material 1 and third material 3.

However, melted resin material 2b of second material 2 is exhausted through exhaust holes (or exhaust grooves) 1a and 3a located outside projections 1E and/or 3E. This enables materials 1, 2, and 3 to be firmly fixed without causing resin material 2b to be flown into fusion zone 12 or without causing welding problems. However, second material 2 becomes unlikely to be indirectly heated and melted. As a result, inner periphery 2A of through-hole 211 cannot be fixed sufficiently or at all to the outer peripheral side of projections 1E and/or 3E.

Figure 2:
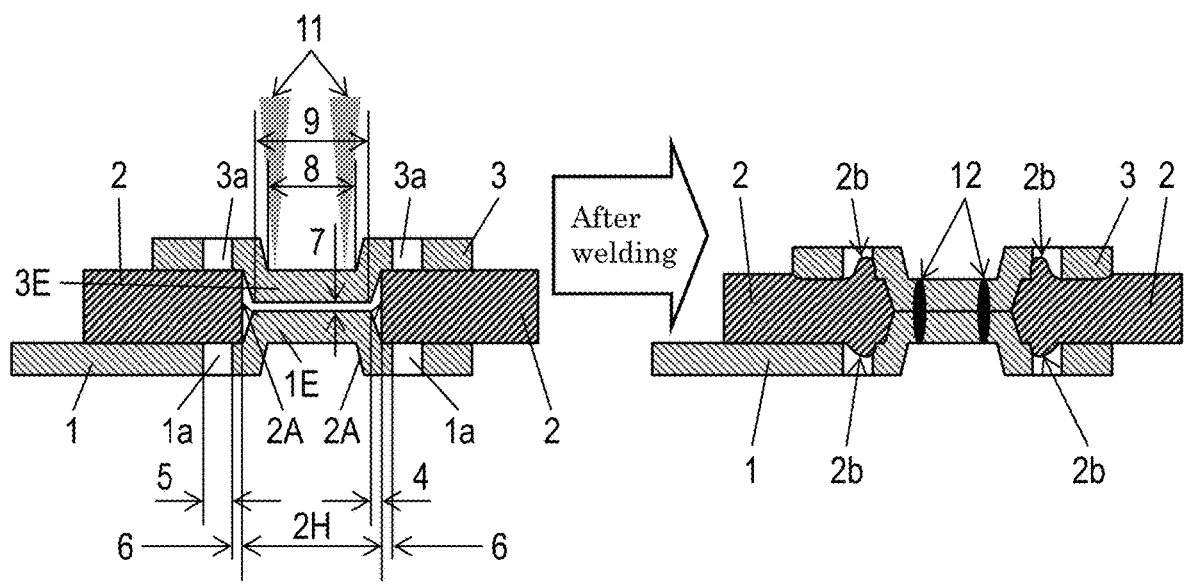
FIG. 2 is a schematic diagram of an example of the joined structure during laser welding according to the first exemplary embodiment of the present disclosure.

In FIGS. 1 and 2, both first material 1 and third material 3 have projections. Meanwhile, in FIGS. 4 and 5, only one of first material 1 and third material 3 has a projection. To be more specific, first material 1 is embossed to form a projection, and third material 3 is flat with no projection. Of course, the opposite case is also possible.

Figure 8:
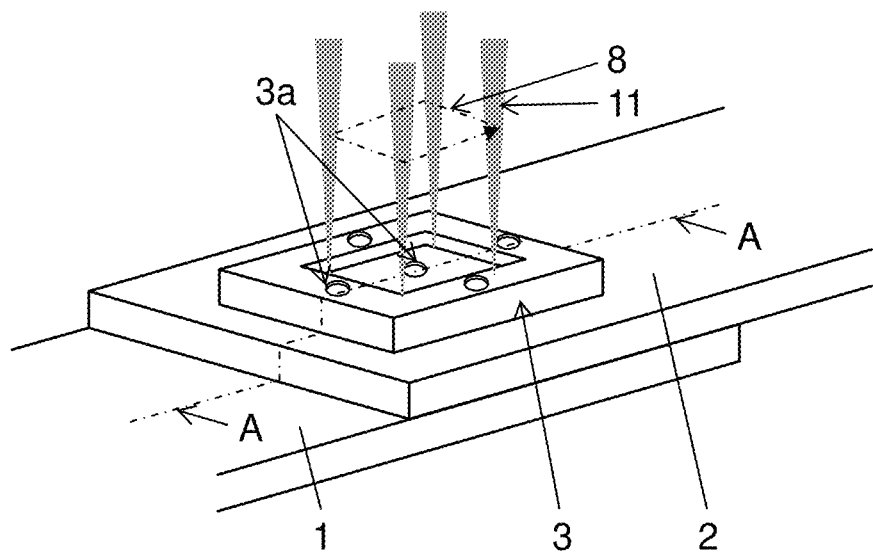
FIG. 8 is a perspective view of an example of the joined structure during laser welding according to the first exemplary embodiment of the present disclosure.
Figure 9:
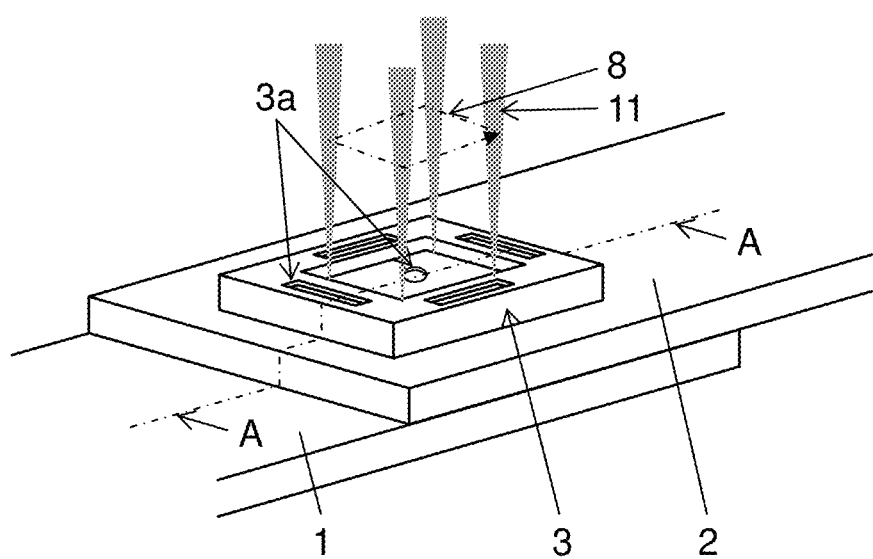
FIG. 9 is a perspective view of an example of the joined structure during laser welding according to the first exemplary embodiment of the present disclosure.

Third material 3 is circular-shaped in FIGS. 6 and 7, and is rectangular-shaped in FIGS. 8 and 9.

In FIGS. 6 to 9, first material 1 and third material 3 each have a plurality of exhaust holes (or exhaust grooves) 1a and 3a. A larger number of exhaust holes (or exhaust grooves) facilitates the exhaust. The number is preferably determined considering the force of first material 1 and third material 3 to retain second material 2 between them.

Figure 10:
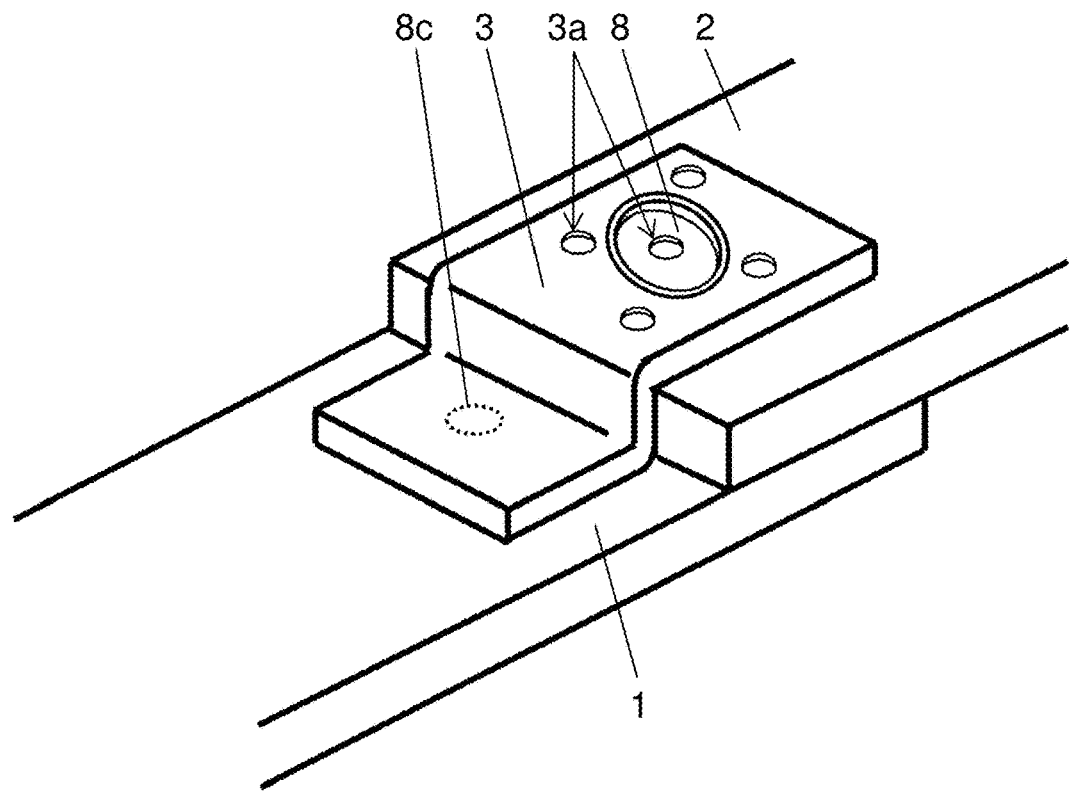
FIG. 10 is a perspective view of an example of the joined structure during laser welding according to the first exemplary embodiment of the present disclosure.
Figure 11:
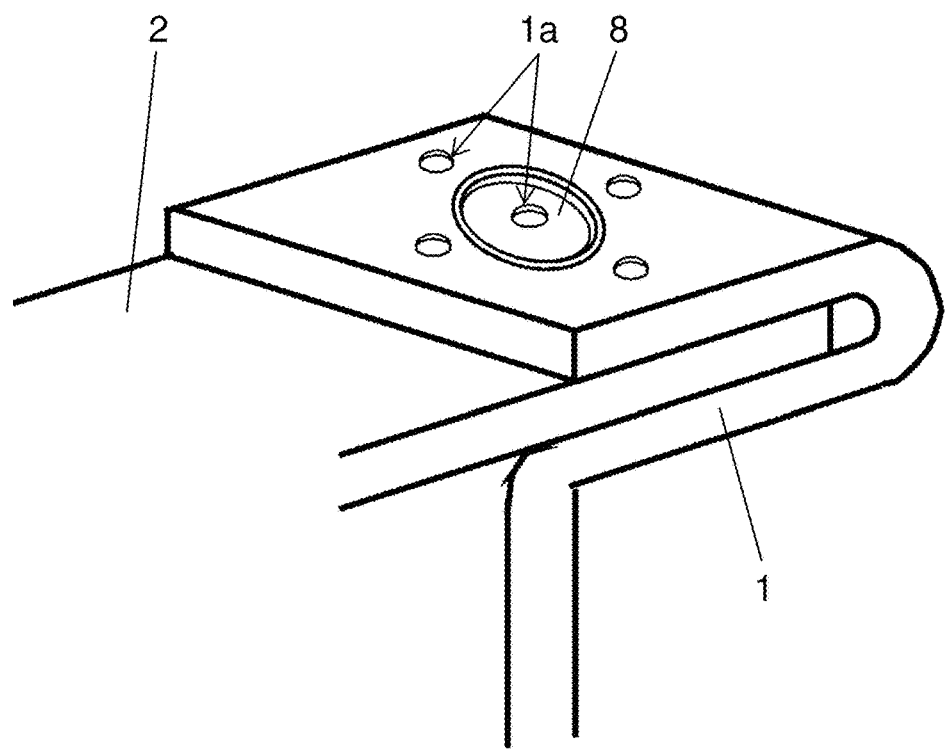
FIG. 11 is a perspective view of an example of the joined structure during laser welding according to the first exemplary embodiment of the present disclosure.

FIGS. 10 and 11 show examples to further improve the tensile strength of first material 1 and third material 3 and to facilitate the positioning of second material 2.

In the joined structure shown in FIG. 10, third material 3 functions to position first material 1 and second material 2 as well as to increase their tensile strength. Second material 2 is sandwiched between first material 1 and third material 3, which has a stepped portion, such that a predetermined second gap 7 is formed between third material 3 and first material 1 along their thickness. In this example, third material 3 has not only projection 3E where third material 3 is joined with first material 1 via second material 2 but also portion 8C where third material 3 is directly joined with first material 1.

This structure shown FIG. 10 can reduce the stress concentration on projection 3E of fusion zone 12 when first material 1 and third material 3 joined through second material 2 are subjected to a tensile force. As a result, the similar metallic materials and the different material can be joined together more firmly.

In FIG. 11, first material 1 is folded back such that second material 2 is sandwiched between projection 1E and another region of first material 1 without using third material 3. This structure does not need a fixing jig for first material 1. Furthermore, inserting second material 2 into first material 1 can temporarily fix and position second material 2.

FIGS. 12 to 15 show examples for facilitating the positioning of second material 2 and the exhaust of plated zinc 13 in gaseous form or the melted resin material.

Figure 12:
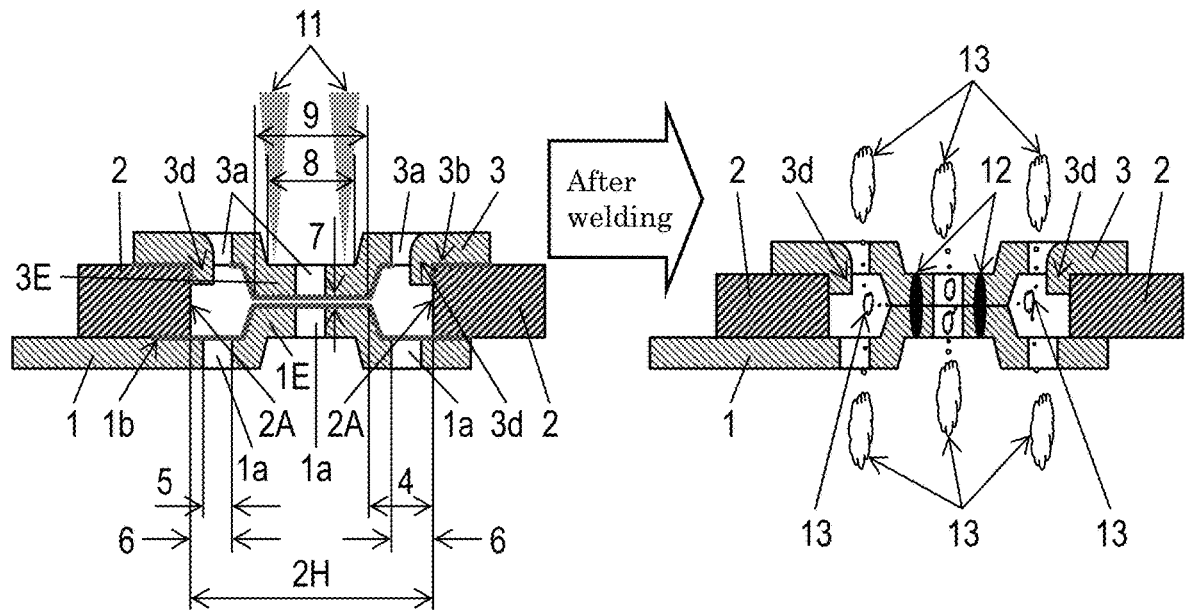
FIG. 12 is a schematic diagram of an example of the joined structure during laser welding according to the first exemplary embodiment of the present disclosure.
Figure 13:
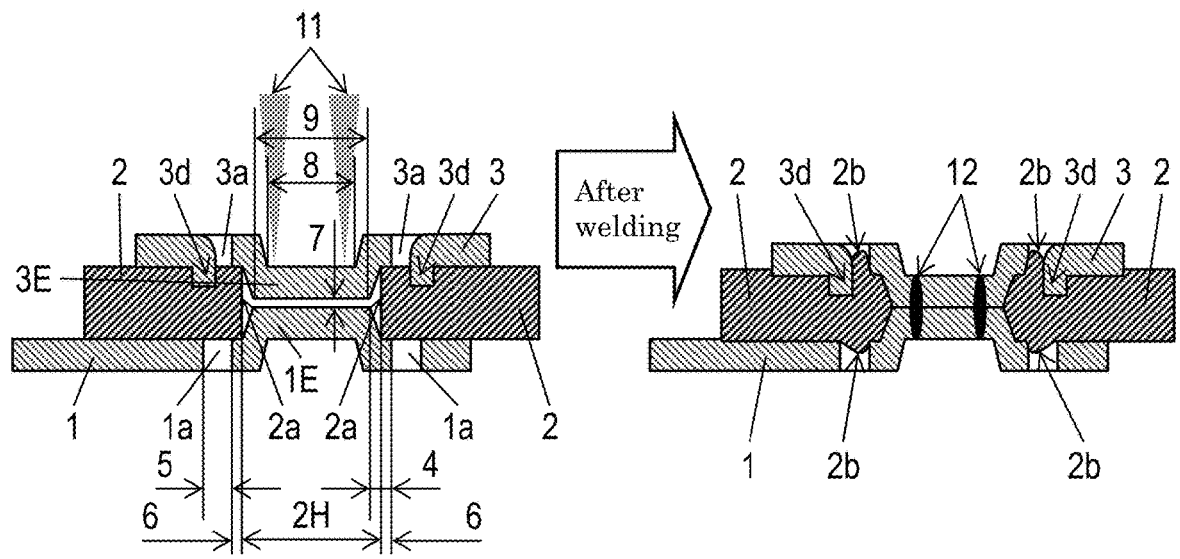
FIG. 13 is a schematic diagram of an example of the joined structure during laser welding according to the first exemplary embodiment of the present disclosure.

In the description so far, exhaust holes (or exhaust grooves) 1a and 3a are formed by a simple hole drilling method. Meanwhile, exhaust holes (or exhaust grooves) 1a and 3a shown in FIGS. 12 and 13 are formed not only by drilling through-holes but also by bending the edge of the through-holes. In this case, exhaust holes (or exhaust grooves) 3a of third material 3 have positioning protrusion 3d at their edge. Positioning protrusion 3d can also be used to position second material 2.

This structure ensures the presence of inner edge region 6 of the exhaust area, which represents the distance between the inner diameter surface B of exhaust holes (or exhaust grooves) 1a and 3a outside projections 1E and/or 3E and inner periphery 2A of through-hole 211.

When second material 2 is a resin or other similar material, liquefied resin material can be injected around positioning protrusion 3d so as to improve the strength of the fixation.

Figure 14:
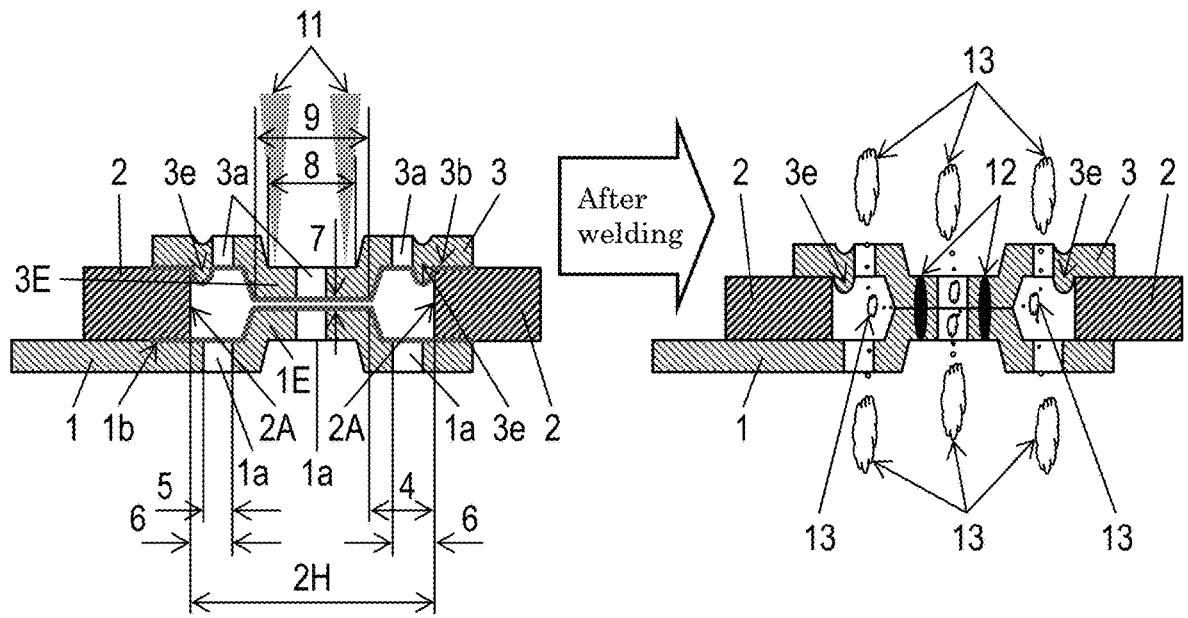
FIG. 14 is a schematic diagram of an example of the joined structure during laser welding according to the first exemplary embodiment of the present disclosure.
Figure 15:
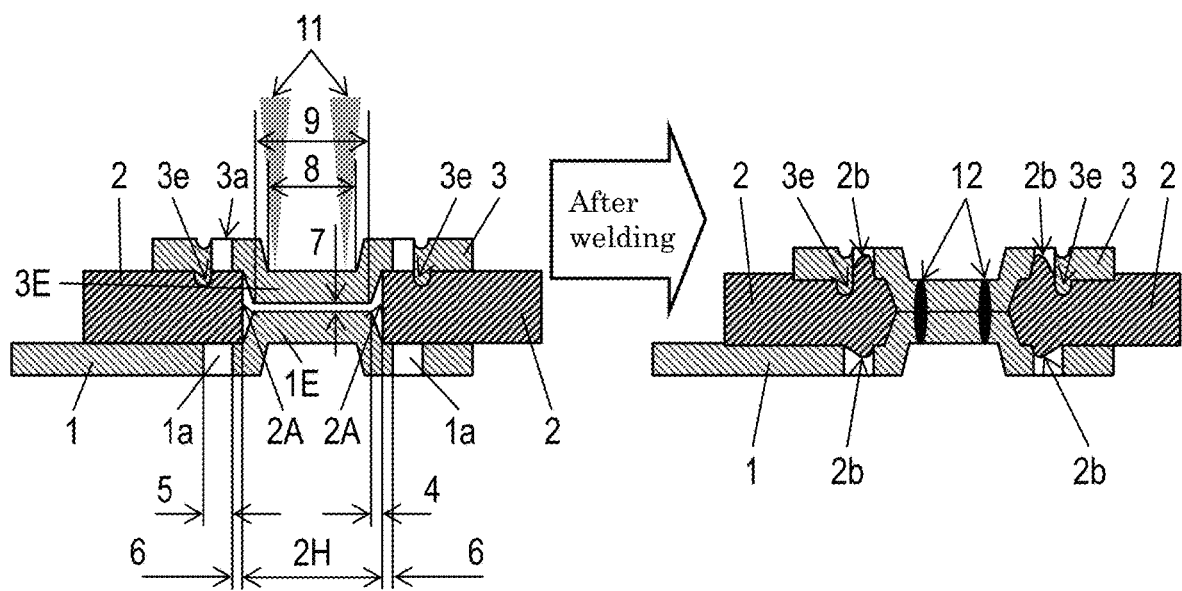
FIG. 15 is a schematic diagram of an example of the joined structure during laser welding according to the first exemplary embodiment of the present disclosure.

FIGS. 14 and 15 show positioning protrusion 3e formed by extruding third material 3 by, for example, pressing. Positioning protrusion 3e is located outside exhaust holes (or exhaust grooves) 1a and 3a located outside projections 1E and 3E. Positioning protrusion 3e functions to position second material 2.

As described so far, positioning protrusion 3e shown in FIGS. 14 and 15 is as effective as positioning protrusion 3d shown in FIGS. 12 and 13. However, positioning protrusion 3d is more rational because it can be formed by a simple hole drilling method.

Positioning protrusions 3d and 3e for positioning the second material are formed in third material 3 alone in the examples shown in FIGS. 12 to 15. Alternatively, however, projections 3d and 3e may be formed in first material 1 alone or in both first material 1 and third material 3. The height of positioning protrusions 3d and 3e of third material 3 does not need to be larger than about half the thickness of second material 2; it can be for example, 0.3 mm. If the positioning protrusions are formed on both first material 1 and third material 3, it is necessary to avoid interference between the positioning protrusions of first material 1 and the positioning protrusions of third material 3.

As described so far, in the joined structure according to the present exemplary embodiment achieved by using laser 11 as the heat source, first material 1 and third material 3 are similar metallic materials weldable to each other. First material 1 and/or third material 3 have projections 1E and/or 3E. Second material 2 is at least one different material different in type and difficult to be welded to the similar metallic materials. Second material 2 has a through part such as through-hole 211 or a through groove. Projections 1E and 3E are inserted in through-hole 211 of second material 2 with first gap 4 is provided inside smaller than the diameter or width of through-hole 211 in the radial or width direction. To be more specific, second material 2 is sandwiched between first material 1 and/or third material 3 such that projections 1E and/or 3E are inserted in through-hole 2H of second material 2 with second gap 7 in the thickness direction. In other words, the projections 1E and/or 3E are in the state of being separated in the thickness direction by the gap 7.

Exhaust holes (or exhaust grooves) 1a and 3a are formed either inside or outside of projections 1E and/or 3E so that plated zinc 13 in gaseous form or the melted resin material can be exhausted through exhaust holes (or exhaust grooves) 1a and 3a. Laser 11 applied along the thickness of first material 1 and/or third material 3 melts first material 1 and/or third material 3 spaced from each other by second gap 7, allowing second material 2 to be compressed by first material 1 and/or third material 3. Thus, second material 2 is fixed to first material 1 and/or third material 3.

It is effective to form exhaust holes (or exhaust grooves) 1a and 3a not only outside but also inside projections 1E and/or 3E. This is because plated zinc 13 in gaseous form can be exhausted more easily through these exhaust holes (or exhaust grooves) 1a and 3a inside and outside projections 1E and/or 3E and through second gap 7. Thus, accelerating the exhaust of plated zinc 13 in gaseous form can improve the exhaust efficiency.

Second Exemplary Embodiment

Figure 16:
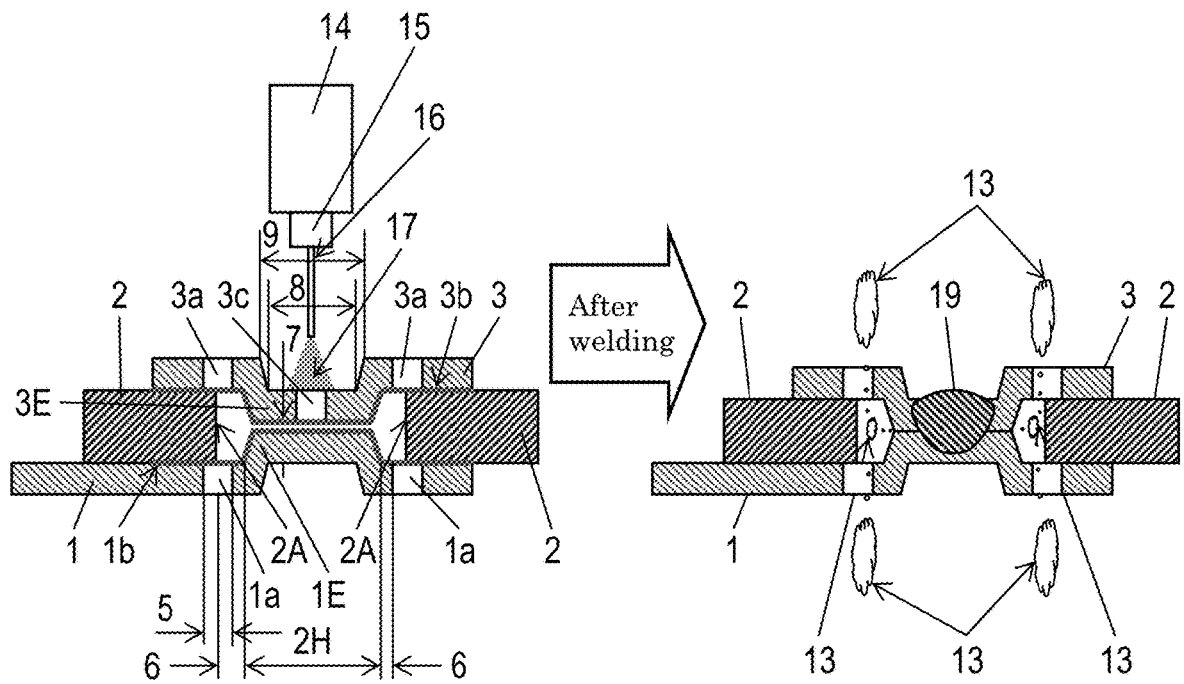
FIG. 16 is a schematic diagram of an example of a joined structure during arc welding according to a second exemplary embodiment of the present disclosure.
Figure 17:
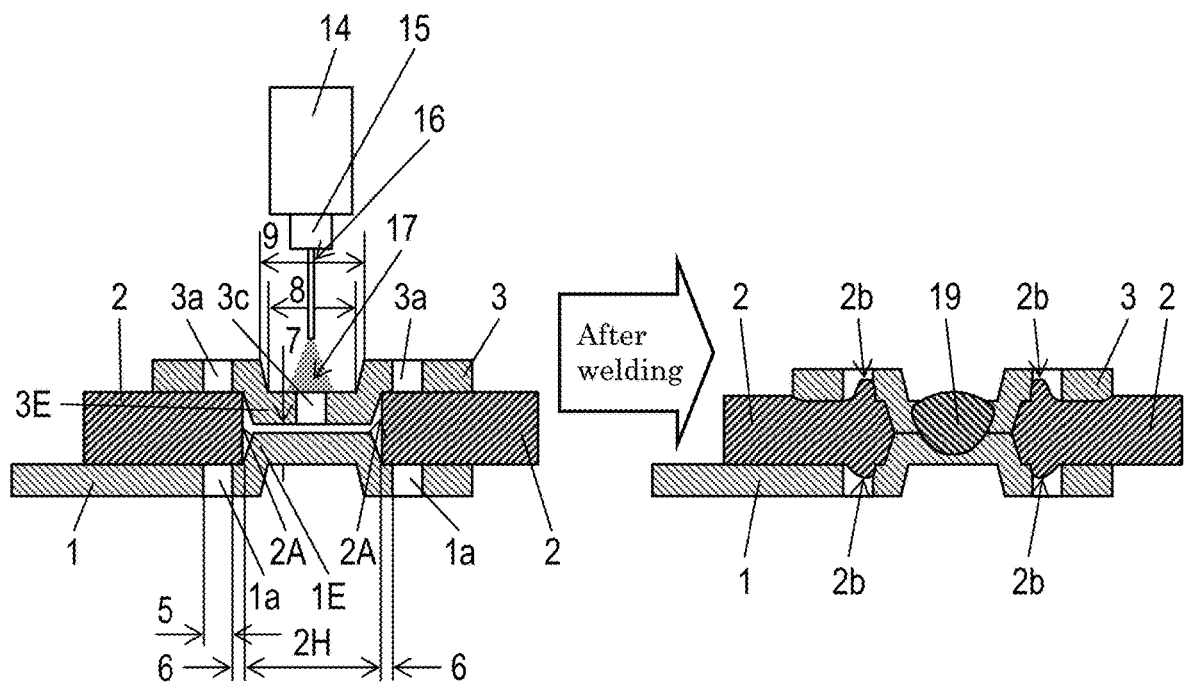
FIG. 17 is a schematic diagram of an example of the joined structure during arc welding according to a second exemplary embodiment of the present disclosure.

A second exemplary embodiment in which the welding heat source is not laser will now be described with reference to FIGS. 16 and 17.

The second exemplary embodiment uses, as the welding heat source, arc instead of laser used in the first exemplary embodiment. When the heat source is arc as shown in FIGS. 16 and 17, projection 3E has arc welding opening 3c at its end. Arc has a lower energy density than laser. Arc welding opening 3c is formed to compensate for this disadvantage in the center of projections 1E and/or 3E, or in other words, at the end of the projection (or projections) to which arc is applied. This facilitates to transfer the arc heat to the portion of fusion zone 19 that is close to second gap 7. Furthermore, melted welding wire 16 can be easily fed to the opposing sides of projections 1E and 3E. Fusion zone 19 has a spot or linear pattern. Exhaust holes (or exhaust grooves) 1a and 3a are formed outside fusion zone 19. In other respects, this structure obtained by using arc as the heat source is the same as the structure obtained by using laser.

Thus, exhaust holes (or exhaust grooves) 1a and 3a can be formed in first material 1 and/or third material 3 between which second material 2 is sandwiched and fixed together. This structure has the advantage of preventing plated zinc 13 in gaseous form or the melted resin material of second material 2 from flowing into fusion zone 19 during welding with arc 17 and accelerating the exhaust flow to the outside.

The joined structure according to the present exemplary embodiment obtained by arc welding has similar effects to the joined structure according to the first exemplary embodiment obtained by laser welding described with FIGS. 6 to 15.

Similar effects can be obtained when the heat source is plasma.

As described hereinbefore, the present disclosure provides a rivet-joined structure that may include a surface-treated material such as a zinc-plated steel sheet or a non-metallic material such as resin, and that can also be produced simply and easily by laser, arc, or plasma welding.

INDUSTRIAL APPLICABILITY

The joined structure according to the aspect of the present disclosure is industrially useful because it is simple and has the advantage of greatly reducing production cycle time, improving stiffness at required positions, and increasing the degree of design freedom in joining different types of materials together.

REFERENCE MARKS IN THE DRAWINGS 1 first material
1a exhaust hole or exhaust groove
1b surface-treated layer
1E, 3E projection
2 second material
2A inner periphery
2b resin material
2H through-hole
3 third material
3a exhaust hole or exhaust groove
3b surface-treated layer
3c arc welding opening
3d positioning protrusion
3e positioning protrusion
4 first gap
5 width of the opening of the first and third materials
6 inner edge region of the exhaust area
7 second gap
8 inner periphery of the projection
9 outer periphery of the projection
11 laser
12,19 fusion zone
13 plated zinc in gaseous form
14 nozzle
15 tip
16 welding wire
17 arc

The invention claimed is:

1. A junction structure comprising:
a first material that is a metallic material, and a third material that is a metallic material and is weldable to the first material, at least one of the first material or the third material having:
  a weld zone where the first material and the third material are melted and joined together; and
  at least one exhaust groove or at least one exhaust hole around the weld zone, the at least one exhaust groove or the at least one exhaust hole penetrating a thickness of the at least one of the first material or the third material; and
a second material which is a nonferrous metallic material or a nonmetallic material, the second material being sandwiched and fixed between the first material and the third material by lap joining,
wherein:
the second material has a through part;
the at least one of the first material or the third material has a projection;
the projection is located in the through part; and
the at least one exhaust groove or the at least one exhaust hole is located outside the projection and is either: (i) located at least partially inside an inner periphery of the through part; or (ii) aligned with the inner periphery of the through part.

2. The junction structure according to claim 1, wherein:
the weld zone has a circular or oval ring-shaped pattern, the circular or oval ring-shaped pattern being a welding pattern to which energy is applied from a heat source; and
the at least one exhaust groove or the at least one exhaust hole is located outside the circular or oval ring-shaped pattern.

3. The junction structure according to claim 1, wherein:
the weld zone has a spot or linear pattern, the spot or linear pattern being a welding pattern to which energy is applied from a heat source; and
the at least one exhaust groove or the at least one exhaust hole is located outside the spot or linear pattern.

4. The junction structure according to claim 1, wherein the at least one of the first material or the third material is melted by energy applied to the projection from a heat source along the thickness of the at least one of the first material or the third material, such that the first material, the third material and the second material are fixed and joined together.

5. The junction structure according to claim 1, wherein the projection has a region to which energy is applied from a heat source along the thickness of the at least one of the first material or the third material, the region being smaller than a diameter or a width of the projection.

6. The junction structure according to claim 2, wherein:
the heat source is a laser; and
the first material and the third material are melted and joined together by the laser being applied along the thickness of the at least one of the first material or the third material such that the second material is sandwiched between the first material and the third material, whereby the first material, the third material, and the second material are fixed together.

7. The junction structure according to claim 2, wherein:
the heat source is an arc; and
the first material and the third material are melted and joined together by the arc being applied along the thickness of the at least one of the first material or the third material such that the second material is sandwiched between the first material and the third material, whereby the first material, the third material, and the second material are fixed together.

8. The junction structure according to claim 2, wherein:
the heat source is a plasma; and
the first material and the third material are melted and joined together by the plasma being applied along the thickness of the at least one of the first material or the third material such that the second material is sandwiched between the first material and the third material, whereby the first material, the third material, and the second material are fixed together.

9. The junction structure according to claim 1, wherein a surface of the second material adjacent to the through part is melted by indirect heat generated when the projection is welded, the surface of the second material adjacent to the through part flowing and being fixed around an outer periphery of the projection.

10. The junction structure according to claim 1, wherein the at least one of the first material or the third material has a positioning protrusion at an end of the at least one exhaust groove or the at least one exhaust hole defined outside the projection, the positioning protrusion protruding toward the second material and being capable of positioning the second material.

11. The junction structure according to claim 10, wherein the first material and the third material comprise two opposing materials.

12. The junction structure according to claim 1, wherein the third material is composed by folding back the first material.

13. The junction structure according to claim 1, wherein:
a diameter or a width of the projection is smaller than a diameter or a width of the through part; and
the projection and the inner periphery of the through part are spaced apart from each other by a gap in a radial direction or a width direction of the through part.

14. The junction structure according to claim 1, wherein:
each of the first material and the third material are ferrous; and
the second material is the nonferrous metallic material.

15. The junction structure according to claim 1, wherein the second material is the nonmetallic material and is carbon fiber reinforced plastic or polyethylene terephthalate.

16. The junction structure according to claim 1, wherein the second material is the nonmetallic material and is resin.

* * * * *